March 31, 1964 B. K. HAWKINS 3,127,195
AUTOMATIC BOOK MARK
Filed Aug. 26, 1958 2 Sheets-Sheet 1
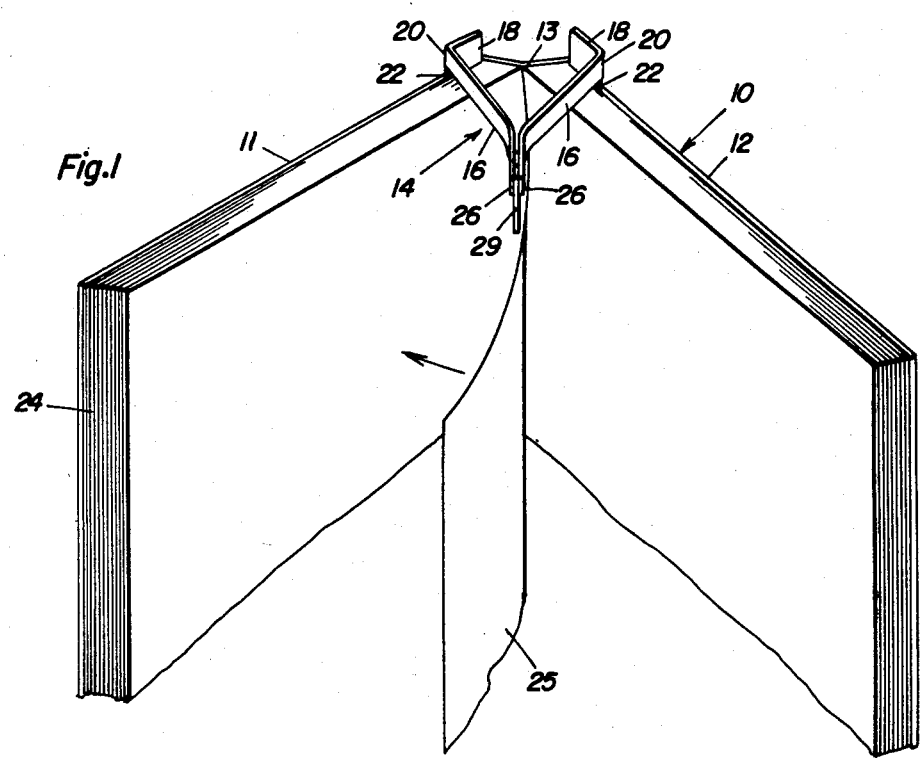
Fig.1
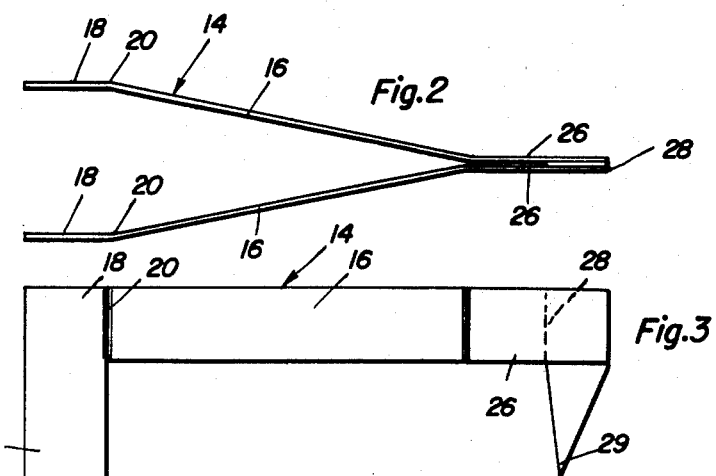
Fig.2
Fig.3
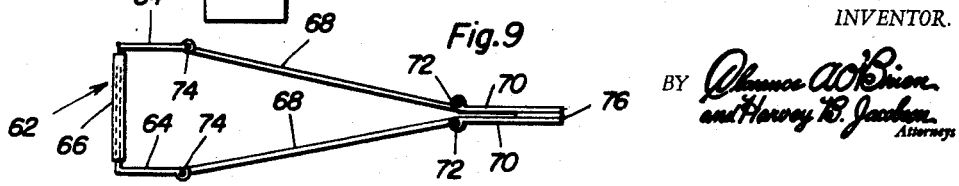
Fig.9
Ben K. Hawkins
INVENTOR.
BY
Attorneys

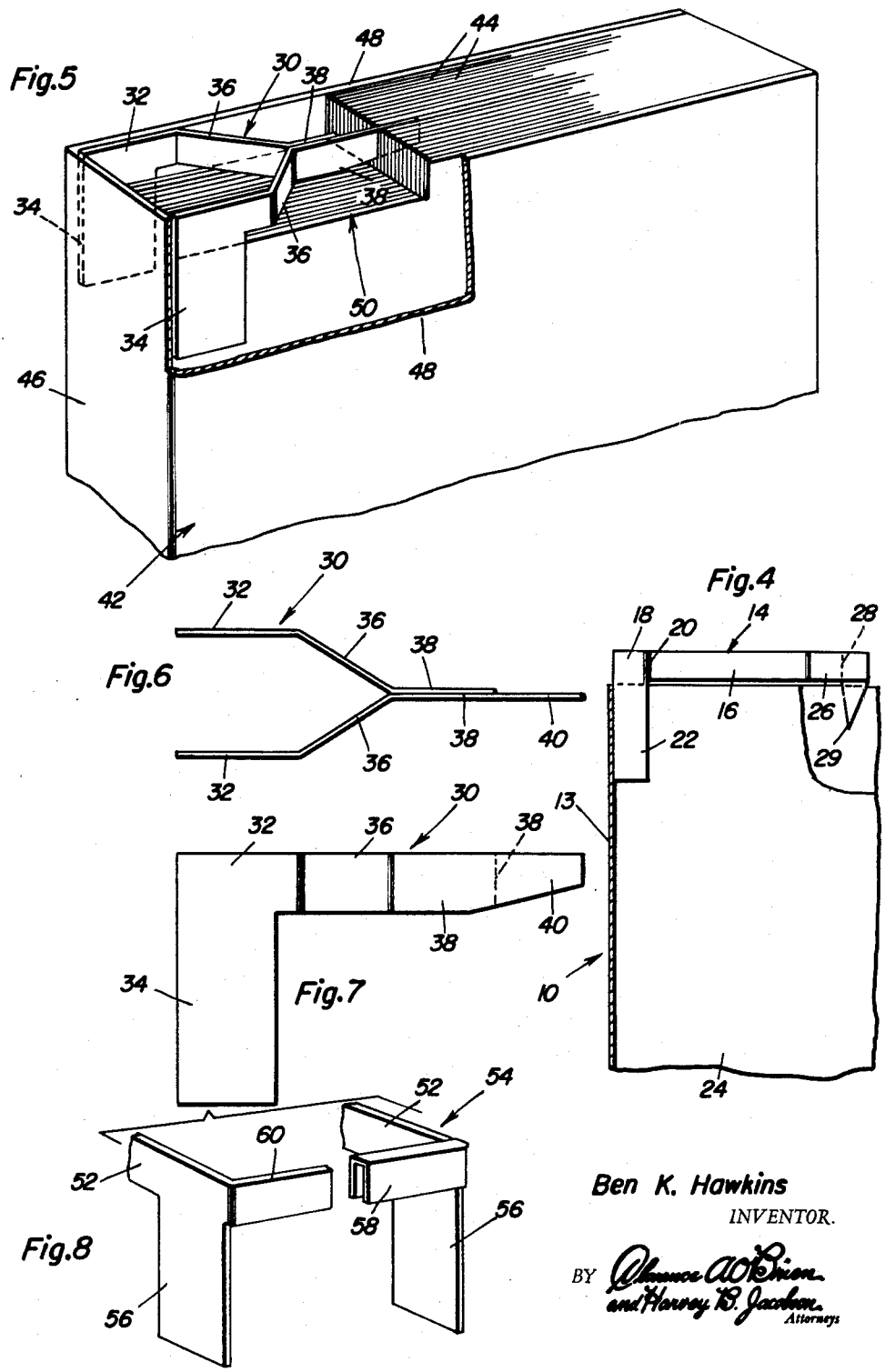
March 31, 1964     B. K. HAWKINS     3,127,195
AUTOMATIC BOOK MARK
Filed Aug. 26, 1958     2 Sheets-Sheet 2
Ben K. Hawkins
INVENTOR.

United States Patent Office 3,127,195
Patented Mar. 31, 1964

3,127,195
AUTOMATIC BOOK MARK
Ben K. Hawkins, Box 5097, 315 Woodlawn Drive, Woodlawn Addition, Greenville, Miss.
Filed Aug. 26, 1958, Ser. No. 757,373
1 Claim. (Cl. 281—42)

The present invention relates to certain new and useful improvements in a mark of a type which is attached to and becomes a part of the book and which is characterized by a bendably resilient flap or marker which is flexibly suspended and functions automatically to mark a place in a book without any effort whatsoever on the part of the reader.

The invention is expressly, but not necessarily, suitable and effectual for persons who make a habit of reading themselves to sleep and which is therefore unique in that the place of reading is kept just in case the reader dozes off to sleep without making any effort to mark the page last read.

The invention also has the purpose of aptly and satisfactorily serving teachers and students while using books in the classroom. It functions with requisite nicety and certainty to mark the place where the lesson was terminated and so that the next day's activities may be resumed without confusion or uncertainty. Also, it is to be understood that the invention lends itself to practical usefulness by any and all book readers who are given to the practice of systematically checking and retaining the desired reading place in a book.

Several embodiments of the invention are herein disclosed. One embodiment comprises a type or construction wherein portions of the leaves or pages adjacent the back or binding of the book are cutaway to form a recess. The invention is such that it lends itself to placement and retention in the recess, thus making it a flush part of the book and adapting it for incorporation in and as a part of the book to be sold with the book.

Another embodiment has to do with a construction or form of the invention characterized by an attaching and suspending yoke of flexibly resilient sheet material and which has attaching tabs at the outward end of the arms of the yoke which may be gummed and adhesively attached to the first and last leaves, said arms being disposed in a plane above the top margin of the book and carrying a depending bendably resilient flap which constitutes the marking finger, said finger lending itself to automatic place marking needs without interfering noticeably with the step-by-step turning of the pages as the reading of the book is carried on in the usual way.

Other objects, features and advantages will become more readily apparent from the following description and the accompanying drawings.

In the drawings, wherein like numerals are employed to designate like parts throughout the views:

FIG. 1 is a view showing a book fragmentarily and in perspective and illustrating the invention and the manner in which it is constructed, applied and used.

FIG. 2 is an enlarged top or plan view of the invention by itself.

FIG. 3 is a side elevation of the same.

FIG. 4 is a view on a smaller scale showing how the arms of the adapter or attaching yoke lie in a plane above the upper edges above the pages or leaves of the book to properly locate the marker flap.

FIG. 5 is a perspective view showing a modification, that is the aspect of the concept wherein the attached portions of the upper marginal portions of the leaves are cutaway to provide an accommodation recess for the automatic book mark and how the latter is applied and constructed.

FIG. 6 is a top plan view of the book mark seen in FIG. 5.

FIG. 7 is a side elevation of the same.

FIG. 8 is a fragmentary perspective view showing a slight modification in construction.

FIG. 9 is a plan view showing a further modification where the invention is constructed of sheet metal and the components are hingedly joined together.

Referring first to FIGS. 1 to 4, inclusive, the book is denoted by the numeral 10 and the front and back covers at 11 and 12. The back or binding is denoted at 13. In the form of the invention seen in these figures the components are constructed from suitable sheet material. An appropriate kind or grade of commercial plastics or cardboard having desired bendably resilient and flexible properties may be used. The adapter and attaching yoke is approximately V-shaped in plan as seen in FIG. 2 and is denoted generally by the numeral 14. The flexibly resilient arms are the same in construction and denoted by the numeral 16. The outward end portions 18 are joined to the arms proper by way of hinging bends 20. As seen in FIG. 3 the attaching tabs 22 depend at right angles from the arms and either the inner or outer sides are coated with gum or a suitable adhesive so that these surfaces may be attached to the first and last leaves, for example, of the book. The turnable or main leaves are denoted by the numeral 24 and the particular leaf which is in the process of being turned so that the right side thereof will be marked is conveniently differentiated by the numeral 25. The converging ends of the arms are substantially flat and disposed in spaced parallelism and is suitably joined together and are denoted at 26. It is between the free ends of these end portions that the mark or marking tab 28 is sandwiched and suitably connected. The lower end of the tab depends at right angles to the arms and is preferably pointed as at 29. This provides a freely yieldable self-accommodating marker finger which cooperates compatibly with the adaptable arms 16. Examining FIGS. 1 and 4 the reader can appreciate how the tabs were applied and secured in place and how the arms 16 overlie the upper edges of the book pages or leaves and how they may accommodatingly yield to positioning and placement of the marker finger and also it will be clear that with the invention or attachment applied as shown as the pages are turned one by one in the usual reading manner the adapter arms 16 and marker fingers 29 yield to the pressure of the page and the finger rides over the top of the page and drops behind the page last read so as to mark the place in a now well-known manner. It may be stated here that I am aware of the fact that similarly constructed and performing book marks of the so-called automatic type have been evolved and patented but apparently have not come into widespread adoption and use. It is believed that the invention herein disclosed and claimed will meet with the manufacturing and requirement of manufacturers and will serve the expected needs of users.

Speaking in terms of generalities the embodiment of the invention seen in FIGS. 5, 6 and 7 is basically the same as the form already described and disposed of. That is to say, in this adaptation the adapter yoke 30 is also constructed of suitable sheet material and the straight parallel portions 32 of the arms are provided with depending suitably gummed (not detailed) attaching or anchoring tabs 34. The converging arm portions 36 have inward end portions which are superposed against each other and secured together as at 38. One end portion is provided with a bendably resilient extension 40 and this constitutes the marker finger. This finger is in a plane with the yoke arm instead of being at right angles to the yoke arms as already described. With this construction the invention may be incorporated in and constitutes an integral part of a book of the type shown for example in FIG. 5. The book is here denoted by the numeral 42 and the leaves proper are denoted at 44 and the back or binding at 46. The covers 48 are not modified. However, the left hand end or hinged portion of the leaves 14 are cutaway to provide what is conveniently referred as a recess or pocket 50. Consequently with this particular construction tabs are glued either to the inside surfaces or to the outside surfaces of the first and last leaves in such a manner that the entire device is incorporated in the recess or pocket. However, the marker finger 40 extends beyond the pocket and is sandwiched between the leaves 44 and flips back and forth in the manner already described.

In FIG. 8 the arms 52 of the yoke 54 are provided with depending attaching tabs 56 and one tab is provided with a lateral channel-like member 58 to telescopically and adjustably receive the cooperating member 60. These two members serve to slidingly connect the yoke arms thus providing a more substantial type of yoke construction and yet allowing the device to be mounted either freely or attached and while at the same time making the desired provision for book size adjustment needs.

In the final modification seen in FIG. 9 the invention may be made from sheet metal components or parts. Here the adapter yoke 62 has the arm portions 64 extensibly or adjustably connected at 66. The converging arm portions or arms proper are denoted at 68 and they converge toward the right where they are provided with flat terminals or extensions 70. The extensions 70 are hingedly connected at 72 to the arms and the arms are in turn hingedly connected at 74 to the short arm portions 64. The marker is sandwiched between the flat end portions 70 and suitably secured in place and is denoted generally by the numeral 76. Here the mechanical action of the hinges is relied upon to allow the necessary freedom of action of the components in accommodating said components to the book means. Basically, however, the construction is the same as that already described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a book embodying front and back covers joined together by a back and with conventional leaves bound for use between the front and back covers, the top edges of said leaves having cooperating notches located adjacent to said back and conjointly forming a substantially shallow pocket for a built-in book mark, and a book mark comprising a yoke of resilient material secluded in said pocket and embodying a pair of companion arms having outer ends provided with integral attaching means and allowing the yoke to be attached to a cooperating portion of the book, said arms being flexibly resilient and permitting the yoke to flip back and forth within the limits of the enveloping pocket, inner end portions of the arms converging, being joined together and providing means which is cooperable with vertical edges of the notched portions of said leaves.

References Cited in the file of this patent

UNITED STATES PATENTS

| | | |
|---|---|---|
| 288,285 | Webb | Nov. 13, 1883 |
| 422,423 | Lanchester | Mar. 4, 1890 |
| 901,225 | Brockett et al. | Oct. 13, 1908 |
| 1,229,516 | Pierce | June 12, 1917 |
| 2,131,448 | Lowen | Sept. 27, 1938 |
| 2,244,246 | Esterly | June 3, 1941 |
| 2,437,074 | Chapin | Mar. 21, 1948 |
| 2,778,331 | Bonella | Jan. 22, 1957 |

FOREIGN PATENTS

| | | |
|---|---|---|
| 133,378 | Germany | Aug. 28, 1902 |
| 313,767 | Great Britain | June 20, 1929 |
| 854,946 | France | Jan. 29, 1940 |